(12) United States Patent
Gao et al.

(10) Patent No.: US 8,095,009 B2
(45) Date of Patent: Jan. 10, 2012

(54) METHOD, SYSTEM AND APPARATUS FOR DISTRIBUTING NODE INFORMATION

(75) Inventors: Jianhua Gao, Shenzhen (CN); Dan Li, Shenzhen (CN); Jianrui Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 669 days.

(21) Appl. No.: 12/241,563

(22) Filed: Sep. 30, 2008

(65) Prior Publication Data

US 2009/0087184 A1 Apr. 2, 2009

(30) Foreign Application Priority Data

Sep. 30, 2007 (CN) .................. 2007 1 0162756

(51) Int. Cl.
*H04J 14/02* (2006.01)
(52) U.S. Cl. ................ 398/83; 398/82; 398/79
(58) Field of Classification Search .............. 398/79, 398/83, 82
See application file for complete search history.

(56) References Cited

U.S. PATENT DOCUMENTS

| 2002/0109879 | A1* | 8/2002 | Wing So | 359/118 |
| 2007/0019904 | A1 | 1/2007 | Bulow | |
| 2007/0212067 | A1* | 9/2007 | Miyazaki et al. | 398/57 |

FOREIGN PATENT DOCUMENTS

| CN | 1372400 A | 10/2002 |
| CN | 1901412 A | 1/2007 |
| EP | 1887733 | 2/2008 |
| WO | WO-2007085173 | 8/2007 |

OTHER PUBLICATIONS

European Search Report regarding Application No. EP 08 16 5483 dated Dec. 9, 2008.
Li J Gao Y Lee Huawei D: Evaluation of Possible Interior Gateway Protocol Extensions for Wavelength Switching Optical Networks dated Jul. 11, 2008.
Dan Li Young Lee Jianhua Gao Huawei: Evaluation of Possible Interior Gateway Protocol Extensions for Wavelength Switching Optical Networks dated Nov. 1, 2007.
G. Bernstein et al. "Framework for GMPLS and PCE Control of Wavelength Switched Optical Networks." Network Working Group. Internet Draft. Sep. 13, 2007.
European Office Action regarding Application No. 08 165 483.2-2415, dated May 8, 2009.

* cited by examiner

*Primary Examiner* — Kinam Park
(74) *Attorney, Agent, or Firm* — Harness, Dickey & Pierce, P.L.C.

(57) ABSTRACT

A method for distributing node information, including an optical node generating an information bit stream based on its own node information and distributing the information bit stream it generates and a wavelength sequence corresponding to the node information. According to various embodiments, an information bit stream is generated based on the node information of an optical node so as to reduce the volume of data in the node information distributed by an optical node.

18 Claims, 6 Drawing Sheets

METHOD, SYSTEM AND APPARATUS FOR DISTRIBUTING NODE INFORMATION

CROSS-REFERENCE TO RELATED APPLICATIONS

This application claims the benefit and priority of Chinese application No. 200710162756.6, filed Sep. 30, 2007. The entire disclosure of the above application is incorporated herein by reference.

FIELD

The present disclosure relates to network communications, in particular, to a method, an apparatus and a system for distributing node information.

BACKGROUND

This section provides background information related to the present disclosure which is not necessarily prior art.

As an infrastructure of telecommunication networks, optical networks have witnessed quick development and become a core of future Wide Area Networks and Metropolitan Area Networks. Of all optical networks, Wavelength Division Multiplexing (WDM) optical networks attract extensive attention. The emergence of Wavelength Routing Switches (WRSs) and Photonic Cross Connectors (PXCs) enable networks to perform data switching in the optical domain. Routing and Wavelength Assignment (RWA) refers to computing routes and assigning wavelengths for connection requests. RWA is one of the core technologies for a WDM optical network. When there arises an optical service setup request, RWA computes how to select a route from the source node to the destination node of the traffic from the physical topology structure of the network and assigns a wavelength for the links that the route passes. Through RWA, an appropriate optical channel is selected and a wavelength is reasonably assigned to the optical channel, so that the finite resources are fully utilized to provide the highest possible communication capacity.

In a WDM optical network, an optical channel is determined by the optical switching nodes and optical links that the channel passes and by the wavelength assigned to each optical link that the channel passes. In an all-optical group without wavelength conversion capabilities, an optical channel must be set up by using a common wavelength for all the links of the route. This is called wavelength continuity constraint. Due to this constraint, optical path computation cannot be simply divided into route selection and wavelength assignment. For instance, such a case may exist: every link of a route has available wavelengths for use, but there is no common wavelength for all the links of the route. In this case, an optical switch with extra optical/electrical conversion and wavelength conversion capabilities may be used to ease the wavelength continuity constraint, and divide an optical channel into several sub-connections with different wavelengths to form an optical path.

An Automatic Switched Optical Network (ASON) is a new-generation optical network that integrates switching and transmission functions. It is a transport network based on dynamic and automatic switching. In an ASON, users dynamically initiate service requests, a node automatically computes and selects routes, and a connection is established, restored and removed through signaling control. Therefore, a very good way for establishment of a connection is to combine an ASON with the RWA of a WDM optical network so that the ASON selects wavelengths and routes for the WDM optical network.

A conventional WDM network is a static point-to-point network. The emergence of intelligent optical switching technologies such as the Optical Cross-Connect (OXC) technology makes a dynamic WDM network possible. Operators can provide end-to-end wavelength switching and configuration without redesigning their networks. Therefore, operators can deploy new services and dynamically add or modify network services.

A mode, that is, separately performing route selection and wavelength assignment, may solve the influence of wavelength continuity constraint and cross-connect restrictions on routing and wavelength assignment. The method adopted by this mode is as follows: the system selects a route without considering wavelength resources and then detects which wavelengths are available along the route, and if no wavelengths are available along the selected route, the system reselects another route and detects which wavelengths are available along the reselected route.

It is better to consider both route selection and wavelength assignment simultaneously, but how to release the information between traffic engineering (TE) links is an issue.

SUMMARY

This section provides a general summary of the disclosure, and is not a comprehensive disclosure of its full scope or all of its features.

An embodiment provides a method for distributing node information, including the following steps: an optical node generates an information bit stream based on its own node information; and the optical node distributes the generated information bit stream and a wavelength sequence corresponding to the node information.

An embodiment further provides an optical node, including a bit stream generation module and a distribution module. The bit stream generation module is configured to generate an information bit stream based on a node information of the optical node itself. The distribution module is configured to distribute the generated information bit stream and a wavelength sequence corresponding to the node information.

An embodiment further provides a system for distributing node information, including:

a first optical node, configured to generate an information bit stream based on its own node information, and distribute the generated information bit stream and a wavelength sequence corresponding to the node information; and a second optical node or a centralized path computation unit, configured to obtain the node information of the first node based on the received bit stream and wavelength sequence.

An embodiment further provides a computer readable medium including code for generating an information bit stream by an optical node based on its own node information, and distributing the generated information bit stream and a wavelength sequence corresponding to the node information by the optical node.

According to various embodiments, an information bit stream is generated based on the node information of an optical node so as to greatly reduce the volume of data in the node information distributed by an optical node.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 2:
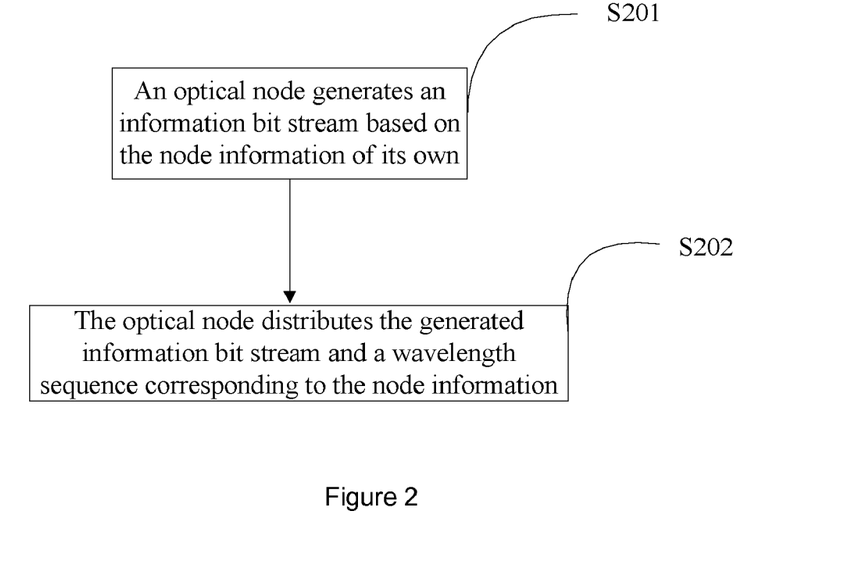
FIG. 2 shows the simplified flowchart of a method for distributing optical node information according to an embodiment.

An embodiment as shown in FIG. 2, includes the following:

S201: An optical node generates an information bit stream based on the node information of its own. For instance, the node information may include a potential wavelength connectivity information between two TE links on the optical node, and a potential wavelength connectivity information bit stream is generated based on the potential wavelength connectivity information; the generating may be performed when a device of the optical node is initialized or changed, or the capability of a device of the optical node is changed. For instance, the node information may include a wavelength occupancy status information of TE links on the optical node, and a wavelength occupancy status information bit stream is generated based on the wavelength occupancy status information; the generating may be performed periodically and/or in real time.

S202: The optical node distributes the generated information bit stream and a wavelength sequence corresponding to the node information. For instance, the optical node may flood the generated information bit stream via an extended IGP protocol to other optical nodes or centralized path computation units in the network. For instance, the generated information bit stream and the wavelength sequence corresponding to the node information may be distributed together or separately. For instance, if the wavelength sequence corresponding to the node information has been distributed, during the distributing of the generated information bit stream, the wavelength sequence may not be distributed again.

Figure 3:
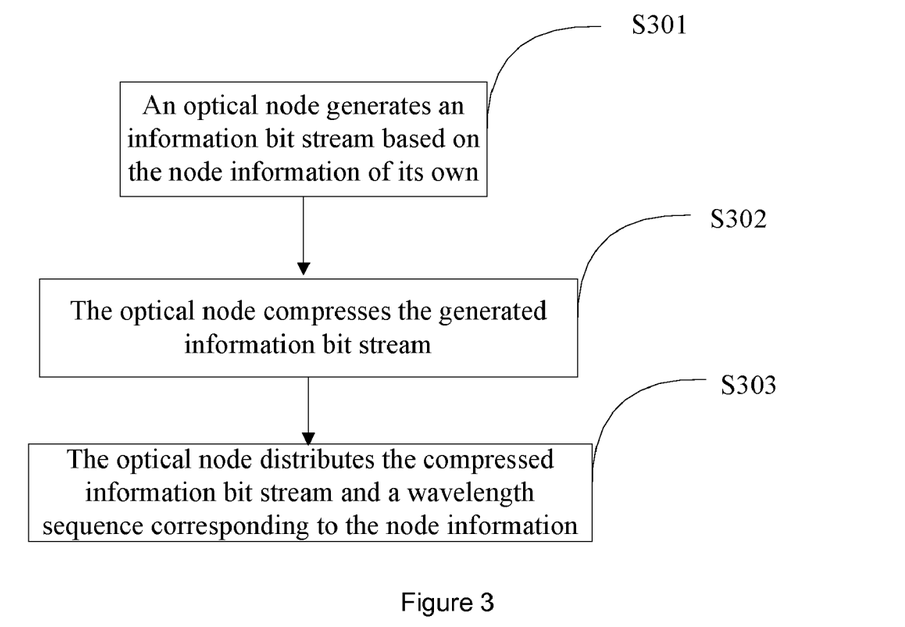
FIG. 3 shows the simplified flowchart of a method for distributing optical node information according to another embodiment.

Another embodiment as shown in FIG. 3, includes the following:

S301: An optical node generates an information bit stream based on the node information of its own.

S302: The optical node compresses the generated information bit stream.

S303: The optical node distributes the compressed information bit stream and a wavelength sequence corresponding to the node information.

The other content of this embodiment is similar to that in the above mentioned embodiment shown in FIG. 2.

Figure 1:
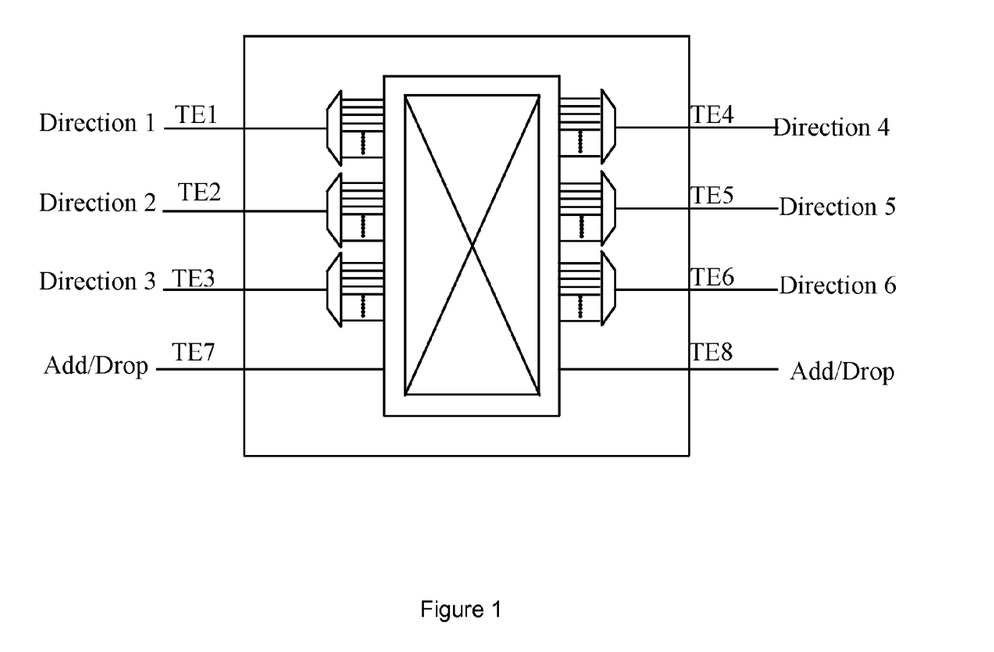
FIG. 1 shows the simplified cross-connect structure of an optical node according to an embodiment.

To facilitate understanding the various embodiments, potential wavelength connectivity information and wavelength occupancy status information are briefly described as follows. FIG. 1 shows the cross-connect structure of an optical node according to an embodiment, where wavelengths may be switched in six line directions: TE1, TE2, TE3, TE4, TE5 and TE6. On the two local links in line directions TE7 and TE8, wavelengths may be added or dropped. Of all the above-mentioned links, each link may bear multiple wavelengths. The optical node shown in FIG. 1 has wavelength conversion capabilities. The cross-connect matrix shown in FIG. 1 may switch wavelengths between various links. In such wavelength switching, both the same wavelength and different wavelengths can be switched. The switching of different wavelengths is performed using a wavelength conversion unit. For instance, the wavelength lambda 1 borne on the link TE1 can be switched to the wavelength Lambda 1 on the link TE4 by cross-connecting, and a wavelength conversion unit should be used to perform conversion to enable the wavelength lambda 1 borne on the link TE2 to be switched to the wavelength lambda 2 on the link TE4.

The connection switching capability of the wavelengths borne on the above-mentioned two TE links is called potential wavelength connectivity. The information used to determine the wavelength connectivity between two TE links is called potential wavelength connectivity information. According to various embodiments, the optical node distributes the potential wavelength connectivity information, so as to make the assignment of wavelength and route more accurate and faster based on the potential wavelength connectivity information when performing route selection and wavelength assignment in a WDM optical network.

Potential wavelength connectivity information is relatively static information that relates to physical devices and is generated during network planning. Once the hardware device configuration of a network is completed, the wavelength connectivity of all the links in the network is determined. In general, the potential wavelength connectivity information does not change unless a hardware device changes. When a hardware device changes, the potential wavelength connectivity information also changes. In addition, for a node with wavelength conversion capability, the potential wavelength connectivity information of the node also changes when the public resources used for wavelength conversion are exhausted. According to various embodiments, the optical node distributes the potential wavelength connectivity information when the device of the optical node is initialized or changed, or the capability of the device of the optical node is changed, so as to further reduce the volume of data distributed by the optical node.

According to various embodiments, an optical node may also distribute a wavelength occupancy status information. The wavelength of a link may be unable to bear other services if it has already occupied by a service, so that the distributing the wavelength occupancy status information makes the assignment of wavelength and route more accurate. The wavelength occupancy status information is a kind of dynamic information changing with the change of traffic borne by the optical node, so that the optical node may distribute the wavelength occupancy status information periodically and/or in real time, so as to realize synchronization in the entire network.

The following descriptions are about the above-mentioned potential wavelength connectivity information and wavelength occupancy status information by taking the links TE1 and TE4 shown in FIG. 1 as an example. Table 1 shows the wavelength occupancy status information about the link TE1. It is assumed that the system, to which the optical node belongs, supports 40 wavelengths, lambda 1 through lambda 40. In the practical application, the number of wavelengths supported by a network is determined by the capabilities of the devices actually deployed. In Table 1, if the occupancy status of a wavelength is set to 0, it indicates that this wavelength is not occupied; if the occupancy status is set to 1, it indicates that the wavelength is already occupied. The occupancy status of a wavelength may be set to 1 to indicate that the wavelength is not occupied or to 0 to indicate that the wavelength is already occupied. Therefore, any similar changes shall be within the protection scope of the embodiments of the present disclosure. The above-mentioned occupancy status may be represented by at least one bit. The occupancy status bits information of all the wavelengths on a TE link constitute the wavelength occupancy status information bit stream of this TE link.

TABLE 1

Wavelength occupancy status information of the link TE1

| | $\lambda 1$ | $\lambda 2$ | $\lambda 3$ | $\lambda 4$ | $\lambda 5$ | $\lambda 6$ | $\lambda 7$ | $\lambda 8$ | ... | $\lambda 35$ | $\lambda 36$ | $\lambda 37$ | $\lambda 38$ | $\lambda 39$ | $\lambda 40$ |
|---|---|---|---|---|---|---|---|---|---|---|---|---|---|---|---|
| Occupancy State | 1 | 1 | 1 | 1 | 1 | 1 | 0 | 0 | | 0 | 0 | 0 | 0 | 0 | 0 |

As shown in Table 1, the occupancy status of the wavelength $\lambda 1$ on the link TE1 is 1, indicating that the wavelength $\lambda 1$ is already occupied; the occupancy status of the wavelength $\lambda 40$ on the link TE1 is 0, indicating that the wavelength $\lambda 40$ is not occupied.

TABLE 2

Wavelength occupancy status information of the link TE4

| | $\lambda 1$ | $\lambda 2$ | $\lambda 3$ | $\lambda 4$ | $\lambda 5$ | $\lambda 6$ | $\lambda 7$ | $\lambda 8$ | ... | $\lambda 35$ | $\lambda 36$ | $\lambda 37$ | $\lambda 38$ | $\lambda 39$ | $\lambda 40$ |
|---|---|---|---|---|---|---|---|---|---|---|---|---|---|---|---|
| Occupancy State | 1 | 1 | 1 | 1 | 1 | 1 | 0 | 0 | | 0 | 0 | 0 | 0 | 0 | 0 |

TABLE 3

Information on the potential wavelength connectivity from the link TE1 to the link TE4

| TE1 | TE4 | | | | | | | | | | | | | | | |
|---|---|---|---|---|---|---|---|---|---|---|---|---|---|---|---|---|
| | $\lambda 1$ | $\lambda 2$ | $\lambda 3$ | $\lambda 4$ | $\lambda 5$ | $\lambda 6$ | $\lambda 7$ | $\lambda 8$ | ... | $\lambda 33$ | $\lambda 34$ | $\lambda 35$ | $\lambda 36$ | $\lambda 37$ | $\lambda 38$ | $\lambda 39$ | $\lambda 40$ |
| $\lambda 1$ | 1 | 1 | 1 | 1 | 1 | 1 | 1 | 1 | ... | 1 | 1 | 1 | 1 | 1 | 1 | 1 |
| $\lambda 2$ | 1 | 1 | 1 | 1 | 1 | 1 | 1 | 1 | ... | 0 | 0 | 0 | 0 | 0 | 0 | 0 |
| $\lambda 3$ | 0 | 0 | 1 | 0 | 0 | 0 | 0 | 0 | ... | 1 | 1 | 1 | 1 | 1 | 1 | 1 |
| $\lambda 4$ | 1 | 1 | 1 | 1 | 1 | 1 | 1 | 1 | ... | 1 | 1 | 1 | 1 | 1 | 1 | 1 |
| $\lambda 5$ | 0 | 0 | 0 | 0 | 1 | 0 | 0 | 0 | ... | 0 | 0 | 0 | 0 | 0 | 0 | 0 |
| $\lambda 6$ | 0 | 0 | 0 | 0 | 0 | 1 | 0 | 0 | ... | 0 | 0 | 0 | 0 | 0 | 0 | 0 |
| $\lambda 7$ | 0 | 0 | 0 | 0 | 0 | 0 | 1 | 0 | ... | 0 | 0 | 0 | 0 | 0 | 0 | 0 |
| $\lambda 8$ | 1 | 1 | 1 | 1 | 1 | 1 | 1 | 1 | ... | 1 | 1 | 1 | 1 | 1 | 1 | 1 |
| ... | ... | ... | ... | ... | ... | ... | ... | ... | | ... | ... | ... | ... | ... | ... | ... |
| $\lambda 33$ | 0 | 0 | 0 | 0 | 0 | 0 | 0 | 0 | ... | 1 | 1 | 1 | 1 | 1 | 1 | 1 |
| $\lambda 34$ | 0 | 0 | 0 | 0 | 0 | 0 | 0 | 0 | ... | 1 | 1 | 1 | 1 | 1 | 1 | 1 |
| $\lambda 35$ | 1 | 1 | 1 | 1 | 1 | 1 | 1 | 1 | ... | 1 | 1 | 1 | 1 | 1 | 1 | 1 |
| $\lambda 36$ | 1 | 1 | 1 | 1 | 1 | 1 | 1 | 1 | ... | 1 | 1 | 1 | 1 | 1 | 1 | 1 |
| $\lambda 37$ | 0 | 0 | 0 | 0 | 0 | 0 | 0 | 0 | ... | 0 | 0 | 0 | 0 | 1 | 0 | 0 |

TABLE 3-continued

Information on the potential wavelength connectivity from the link TE1 to the link TE4

| TE1 | TE4 | | | | | | | | | | | | | | | | |
|---|---|---|---|---|---|---|---|---|---|---|---|---|---|---|---|---|---|
| | λ1 | λ2 | λ3 | λ4 | λ5 | λ6 | λ7 | λ8 | ... | λ33 | λ34 | λ35 | λ36 | λ37 | λ38 | λ39 | λ40 |
| λ38 | 0 | 0 | 0 | 0 | 0 | 0 | 0 | 0 | ... | 0 | 0 | 0 | 0 | 0 | 1 | 0 | 0 |
| λ39 | 1 | 1 | 1 | 1 | 1 | 1 | 1 | 1 | ... | 1 | 1 | 1 | 1 | 1 | 1 | 1 | 1 |
| λ40 | 1 | 1 | 1 | 1 | 1 | 1 | 1 | 1 | ... | 1 | 1 | 1 | 1 | 1 | 1 | 1 | 1 |

Figure 4:
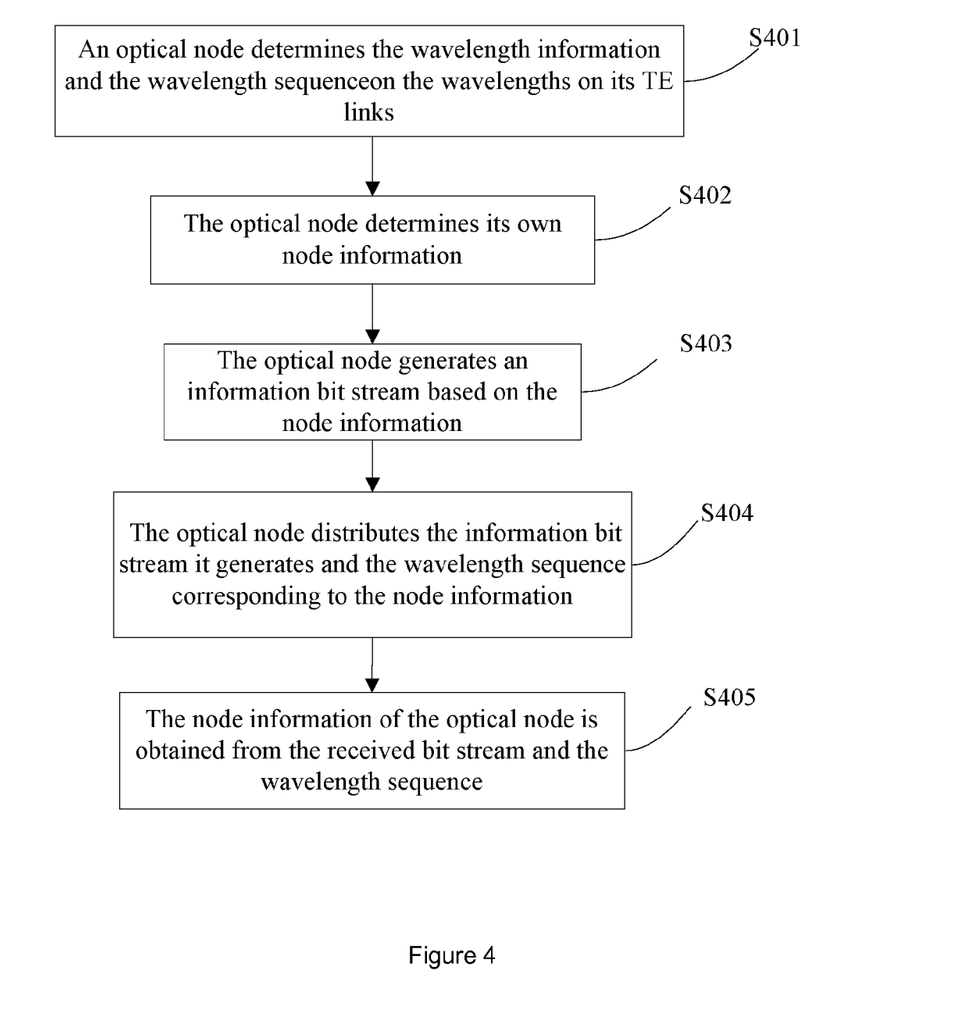
FIG. 4 shows the simplified flowchart of a method for distributing optical node information according to an embodiment.

FIG. 4 shows the simplified flowchart of a method for distributing node information according to an embodiment, including the following:

S401: An optical node determines the wavelength information and the wavelength sequence on its TE links.

S402: The optical node determines its own node information such as Potential wavelength connectivity information. It may also determine the wavelengths occupancy status information of its own in an embodiment.

S403: The optical node generates an information bit stream based on the node information. As can be seen from the information on the wavelength connectivity from the link TE1 to the link TE4 in Table 3, the volume of data in the potential wavelength connectivity information is huge. In this example, the link TE1 and the link TE4 respectively has 40 wavelengths. Therefore, the information on the wavelength connectivity between the two links involves 1,600 pieces of unit information (40 rows×40 columns). According to various embodiments, an optical node generates an information bit stream based on its own node information, and the cross-connect capability of each pair of wavelengths (namely potential wavelength connectivity) is expressed by at least one bit. The bits representing the cross-connect capability between all the wavelengths of two or more TE links on an optical node constitute the potential wavelength connectivity information bit stream (bitmap list) of this optical node. For example, the potential wavelength connectivity information bit stream as shown in Table 4 is generated from the potential wavelength connectivity information as shown in Table 3. Similarly, a wavelength occupancy status information bit stream is generated from wavelength occupancy status information.

TABLE 4

Generated potential wavelength connectivity
information bit stream from the link TE1 to the link TE4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|D| B |C|  Compression  |                  Reserved              |
        algorithm
+-+-+-+-+-+-+-+-+-+-+-+-+-+-+-+-+-+-+-+-+-+-+-+-+-+-+-+-+-+-+-+-+
|             row               |            column              |
+-+-+-+-+-+-+-+-+-+-+-+-+-+-+-+-+-+-+-+-+-+-+-+-+-+-+-+-+-+-+-+-+
|                            reach_link                          |
+-+-+-+-+-+-+-+-+-+-+-+-+-+-+-+-+-+-+-+-+-+-+-+-+-+-+-+-+-+-+-+-+
|1 1 1 1 1 1 1 1 . . . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
```

TABLE 4-continued

Generated potential wavelength connectivity
information bit stream from the link TE1 to the link TE4

```
|1 1 1 1 1 1 1 1 1 1 1 1 1 1 1 1 . . . . . . . . . . . . . . . .|
+-+-+-+-+-+-+-+-+-+-+-+-+-+-+-+-+-+-+-+-+-+-+-+-+-+-+-+-+-+-+-+-+
|. . . . . . . . 0 0 0 0 0 0 0 0 0 0 1 0 0 0 0 0 . . . . . . . .|
+-+-+-+-+-+-+-+-+-+-+-+-+-+-+-+-+-+-+-+-+-+-+-+-+-+-+-+-+-+-+-+-+
|. . . . . . . . . . . . . . . . 1 1 1 1 1 1 1 1 1 1 1 1 1 1 1 1|
+-+-+-+-+-+-+-+-+-+-+-+-+-+-+-+-+-+-+-+-+-+-+-+-+-+-+-+-+-+-+-+-+
|. . . . . . . . . . . . . . . . . . . . . . . . 1 1 1 1 1 1 1 1|
+-+-+-+-+-+-+-+-+-+-+-+-+-+-+-+-+-+-+-+-+-+-+-+-+-+-+-+-+-+-+-+-+
|0 0 0 0 1 0 0 0 . . . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
|0 0 0 0 0 0 0 0 0 0 0 0 0 1 0 0 . . . . . . . . . . . . . . . .|
+-+-+-+-+-+-+-+-+-+-+-+-+-+-+-+-+-+-+-+-+-+-+-+-+-+-+-+-+-+-+-+-+
|. . . . . . . . 0 0 0 0 0 0 0 0 0 0 0 0 0 0 1 0 . . . . . . . .|
+-+-+-+-+-+-+-+-+-+-+-+-+-+-+-+-+-+-+-+-+-+-+-+-+-+-+-+-+-+-+-+-+
|. . . . . . . . . . . . . . . . 0 0 0 0 0 0 0 0 1 1 1 1 1 1 1 1|
+-+-+-+-+-+-+-+-+-+-+-+-+-+-+-+-+-+-+-+-+-+-+-+-+-+-+-+-+-+-+-+-+
|. . . . . . . . . . . . . . . . . . . . . . . . 1 1 1 1 1 1 1 1|
+-+-+-+-+-+-+-+-+-+-+-+-+-+-+-+-+-+-+-+-+-+-+-+-+-+-+-+-+-+-+-+-+
|            ...     ...      ...      ...                      |
+-+-+-+-+-+-+-+-+-+-+-+-+-+-+-+-+-+-+-+-+-+-+-+-+-+-+-+-+-+-+-+-+
|            ...     ...      ...                               |
+-+-+-+-+-+-+-+-+-+-+-+-+-+-+-+-+-+-+-+-+-+-+-+-+-+-+-+-+-+-+-+-+
|0 0 0 0 0 0 0 0 . . . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
|1 1 1 1 1 1 1 1 0 0 0 0 0 0 0 0 . . . . . . . . . . . . . . . .|
+-+-+-+-+-+-+-+-+-+-+-+-+-+-+-+-+-+-+-+-+-+-+-+-+-+-+-+-+-+-+-+-+
|. . . . . . . . 1 1 1 1 1 1 1 1 1 1 1 1 1 1 1 1 . . . . . . . .|
+-+-+-+-+-+-+-+-+-+-+-+-+-+-+-+-+-+-+-+-+-+-+-+-+-+-+-+-+-+-+-+-+
|. . . . . . . . . . . . . . . . 1 1 1 1 1 1 1 1 1 1 1 1 1 1 1 1|
+-+-+-+-+-+-+-+-+-+-+-+-+-+-+-+-+-+-+-+-+-+-+-+-+-+-+-+-+-+-+-+-+
|. . . . . . . . . . . . . . . . . . . . . . . . 1 1 1 1 1 1 1 1|
+-+-+-+-+-+-+-+-+-+-+-+-+-+-+-+-+-+-+-+-+-+-+-+-+-+-+-+-+-+-+-+-+
|0 0 0 0 0 0 0 0 . . . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
|0 0 0 0 1 0 0 0 0 0 0 0 0 0 0 0 . . . . . . . . . . . . . . . .|
+-+-+-+-+-+-+-+-+-+-+-+-+-+-+-+-+-+-+-+-+-+-+-+-+-+-+-+-+-+-+-+-+
|. . . . . . . . 0 0 0 0 0 1 0 0 1 1 1 1 1 1 1 1 . . . . . . . .|
+-+-+-+-+-+-+-+-+-+-+-+-+-+-+-+-+-+-+-+-+-+-+-+-+-+-+-+-+-+-+-+-+
|. . . . . . . . . . . . . . . . 1 1 1 1 1 1 1 1 1 1 1 1 1 1 1 1|
+-+-+-+-+-+-+-+-+-+-+-+-+-+-+-+-+-+-+-+-+-+-+-+-+-+-+-+-+-+-+-+-+
|. . . . . . . . . . . . . . . . . . . . . . . . 1 1 1 1 1 1 1 1|
+-+-+-+-+-+-+-+-+-+-+-+-+-+-+-+-+-+-+-+-+-+-+-+-+-+-+-+-+-+-+-+-+
```

An embodiment as shown in Table 4, besides potential wavelength connectivity information bit stream, may also include overhead information added for simplifying or analyzing the bit stream, examples are given as follows for illustration. "D" indicates whether the wavelengths connectivity of the TE links described in the table are unidirectional or bidirectional. For instance, if "D" indicates that the direction is bidirectional, Table 4 also indicates the wavelength connectivity in the direction from the link TE4 to the link TE1. "B" indicates whether the cross-connect of the wavelengths is blocked. For instance, 00 indicates the cross-connect is blocked. The blocking state of the wavelengths is described in the subsequent bitmap list. 01 indicates that each wavelength of the two TE links can be cross-connected to a same wavelength in a non-blocking way. 10 indicates Reserved. 11 indicates non-blocking, that is, any wavelength of the TE link can reach any wavelength of the other specified TE link. In the case of non-blocking, the value of "row" and "column" can be omitted and "bitmap list" is 1 for all, therefore the "bitmap list" may be omitted. "C" is a data compression indication. For instance, 0 indicates the subsequent potential wavelength connectivity information bit stream is not compressed. 1 indicates that the subsequent potential wavelength connectivity information bit stream is compressed. "Compression algorithm" indicates the used compression algorithm. For instance, when "C" is set to 1, "Compression algorithm" indicates the used compression algorithm. "Reserved" indicates that they are reserved for other uses. "reach_link" indicates the destination TE link involved in the potential wavelength connectivity described in the table. In this example, the destination link is the link TE4 and the source link is the link TE1. "row" and "column" indicate the number of rows and the number of columns in the matrix "bitmap list", for instance, in this example it is 40 rows and 40 columns, and the subsequent bit stream is potential wavelength connectivity information from the 40 wavelengths of the link TE1 to the 40 wavelengths of the link TE4. Through the bit stream shown in Table 4, the potential wavelength connectivity information from the link TE1 to the link TE4 is described. For instance, the first 40 consecutive bit stream in Table 4: 1 1 1 1 1 1 1 1 1 . . . 1 1 1 1 1 1 1 1, respectively indicates the connectivity from the wavelength λ1 of the link TE1 to the wavelengths λ1 through λ40 of the link TE4; the second 40 consecutive bit stream: 1 1 1 1 1 1 1 1 . . . 0 0 0 0 0 0 0 0, respectively indicates the connectivity from the wavelength λ2 of the link TE1 to the wavelengths λ1 through λ40 of the link TE4.

TABLE 5

Generated potential wavelength connectivity
information bit stream from the link TE1 to other links

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|D| B |C|  Compression  | W |         Reserved                  |
           algorithm
+-+-+-+-+-+-+-+-+-+-+-+-+-+-+-+-+-+-+-+-+-+-+-+-+-+-+-+-+-+-+-+-+
|                          reach_link1                           |
+-+-+-+-+-+-+-+-+-+-+-+-+-+-+-+-+-+-+-+-+-+-+-+-+-+-+-+-+-+-+-+-+
|                          bitmap list1                          |
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
```

TABLE 5-continued

Generated potential wavelength connectivity
information bit stream from the link TE1 to other links

```
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
|                          reach_link2                           |
+-+-+-+-+-+-+-+-+-+-+-+-+-+-+-+-+-+-+-+-+-+-+-+-+-+-+-+-+-+-+-+-+
|                          bitmap list2                          |
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
|                          reach_link m                          |
+-+-+-+-+-+-+-+-+-+-+-+-+-+-+-+-+-+-+-+-+-+-+-+-+-+-+-+-+-+-+-+-+
|                          bitmap list m                         |
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
                  |. . . . . . . . . . . . . . . . . . . . . . .|
+-+-+-+-+-+-+-+-+-+-+-+-+-+-+-+-+-+-+-+-+-+-+-+-+-+-+-+-+-+-+-+-+
```

Another embodiment as shown in Table 5 which indicates a generated potential wavelength connectivity information bit stream from the link TE1 to other links. "D", "B", "C", "Compression algorithm", and "Reserved" in Table 5 are similar to those fields in Table 4, so they are not repeatedly described here. "W" indicates how many bits are employed to indicate the connectivity information in the "bitmap list", for instance, 0 indicates 1 bit, 1 indicates 2 bit, the rest may be deduced by analogy. "reach_link" indicates the destination TE link involved in the potential wavelength connectivity described in the table. In this example, "reach_link1" indicates from the link TE1 to the link TE4, the subsequent "bitmap list1" is potential wavelength connectivity information of these two links; "reach_link2" indicates from the link TE1 to the link TE5, the subsequent "bitmap list2" is potential wavelength connectivity information of these two links. According to this embodiment, bit streams of information between several links are generated in one time and distributed in one time, so as to reduce the times of the information distribution.

S404: The optical node distributes the information bit stream it generates and the wavelength sequence corresponding to the node information. For instance, the optical node floods the information bit stream it generates and the wavelength sequence corresponding to the node information via an Interior Gateway Protocol (IGP) to other optical nodes or a centralized path computation unit.

If the node information only includes the potential wavelength connectivity information of the optical node, the optical node distributes the potential wavelength connectivity information bit stream and the wavelength sequence corresponding to the wavelength potential wavelength connectivity information, wherein the wavelength sequence is, for instance, the wavelength sequence λ1 λ2 λ3 λ4 λ5 λ6 λ7 λ8 . . . λ33 λ34 λ35 λ36 λ37 λ38 λ39 λ40 of the links TE1 and TE4. The above-mentioned potential wavelength connectivity information bit stream and the corresponding wavelength sequence may be distributed by several modes, for instance:

the potential wavelength connectivity information bit stream and the corresponding wavelength sequence may be distributed at the same time through one packet; or the potential wavelength connectivity information bit stream is distributed first and then the corresponding wavelength sequence; or the corresponding wavelength sequence is distributed first and then the potential wavelength connectivity information bit stream.

In an embodiment, if the node information includes both potential wavelength connectivity information and wavelength occupancy status information, different modes may be employed to distribute the potential wavelength connectivity information bit stream, the wavelength occupancy status information bit stream and the corresponding wavelength sequence according to the specific characteristics of potential wavelength connectivity information and wavelength occupancy status information. Potential wavelength connectivity information is relatively static information, in general, it does not change unless the hardware changes or the wavelength conversion resource changes. Therefore, the potential wavelength connectivity information bit stream is to be flooded only once at the system initialization. It is unnecessary to update the potential wavelength connectivity information if the subsequent potential wavelength connectivity information does not change. In this way, the volume of data in the flooded information is further reduced. Wavelength occupancy status information is dynamic information, changing in real time. Therefore, the wavelength occupancy status information may be distributed in a mode of periodically and/or in real time so as to keep the entire network synchronized. The mode of distributing in real time refers to distribute instantly after the wavelength occupancy status information changes. The mode of distributing periodically refers to distribute the wavelength occupancy status information at a set interval, no matter whether the information changes or not. In another embodiment, it may combine the two mentioned modes. In addition, a wavelength sequence may also be distributed which is corresponding to the wavelength sequence of the potential wavelength connectivity information bit stream and the wavelength occupancy status information bit stream, so that the received bit stream information can be analyzed according to the wavelength sequence.

In another embodiment, the generated node information bit stream and the corresponding wavelength sequence may be distributed together or be distributed respectively. Furthermore, if the corresponding wavelength sequence has been distributed, and wavelength sequence of the node information bit stream which is to be distributed is consistent with the distributed corresponding wavelength sequence, the wavelength sequence of the node information bit stream may not be distributed again. In this way, the volume of the data distributed is reduced. For instance, the node information includes potential wavelength connectivity information and wavelength occupancy status information, and the wavelength sequence corresponding to the potential wavelength connectivity information is consistent with the wavelength sequence corresponding to the wavelength occupancy status information. In this case, the corresponding wavelength sequence may be distributed only once during the distribution of the potential wavelength connectivity information bit stream or the wavelength occupancy status information bit stream. An example is as follows. The wavelength sequence is distributed during the distribution of the wavelength occupancy status information bit stream, and then the same wavelength sequence is not distributed again during the distribution of the potential wavelength connectivity information bit stream. For instance, a link sub-TLV (Type, Length, Value) is added to a TE LSA (Link State Advertisement) to support the flooding of the potential wavelength connectivity information bit stream and the wavelength occupancy status information bit stream. Two types of sub_TLV are required. One is used to represent the wavelength occupancy status information of a TE link and the other is used to represent the potential wavelength connectivity of the TE link.

TABLE 6

Format of the sub_TLV representing wavelength availability status

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Reserved                      |           lambda_num           |
+-+-+-+-+-+-+-+-+-+-+-+-+-+-+-+-+-+-+-+-+-+-+-+-+-+-+-+-+-+-+-+-+
|                         lambda1_value                          |
+-+-+-+-+-+-+-+-+-+-+-+-+-+-+-+-+-+-+-+-+-+-+-+-+-+-+-+-+-+-+-+-+
|                         lambda2_value                          |
+-+-+-+-+-+-+-+-+-+-+-+-+-+-+-+-+-+-+-+-+-+-+-+-+-+-+-+-+-+-+-+-+
|                             ......                             |
+-+-+-+-+-+-+-+-+-+-+-+-+-+-+-+-+-+-+-+-+-+-+-+-+-+-+-+-+-+-+-+-+
|                         lambdan_value                          |
+-+-+-+-+-+-+-+-+-+-+-+-+-+-+-+-+-+-+-+-+-+-+-+-+-+-+-+-+-+-+-+-+
|                        occupancy_status                        |
+-+-+-+-+-+-+-+-+-+-+-+-+-+-+-+-+-+-+-+-+-+-+-+-+-+-+-+-+-+-+-+-+
|                              ...                               |
+-+-+-+-+-+-+-+-+-+-+-+-+-+-+-+-+-+-+-+-+-+-+-+-+-+-+-+-+-+-+-+-+
|                        occupancy_status                        |
+-+-+-+-+-+-+-+-+-+-+-+-+-+-+-+-+-+-+-+-+-+-+-+-+-+-+-+-+-+-+-+-+
```

In Table 6, "Reserved" indicates the bits are reserved; "lambda_num" indicates the number of wavelengths borne by the TE link; "lambda1_value" through "lambdan_value" respectively indicates the number of each wavelength borne by the TE link and correspond to the wavelength sequence; "occupancy_status" indicates whether the wavelength is occupied and may be expressed by a wavelength occupancy status information bit stream.

TABLE 7

Another format of the sub_TLV representing wavelength occupancy status

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| W | Reserved                  |           lambda_num           |
+-+-+-+-+-+-+-+-+-+-+-+-+-+-+-+-+-+-+-+-+-+-+-+-+-+-+-+-+-+-+-+-+
|                         lambda1_value                          |
+-+-+-+-+-+-+-+-+-+-+-+-+-+-+-+-+-+-+-+-+-+-+-+-+-+-+-+-+-+-+-+-+
|                         lambda2_value                          |
+-+-+-+-+-+-+-+-+-+-+-+-+-+-+-+-+-+-+-+-+-+-+-+-+-+-+-+-+-+-+-+-+
|                             ......                             |
+-+-+-+-+-+-+-+-+-+-+-+-+-+-+-+-+-+-+-+-+-+-+-+-+-+-+-+-+-+-+-+-+
|                         lambdan_value                          |
+-+-+-+-+-+-+-+-+-+-+-+-+-+-+-+-+-+-+-+-+-+-+-+-+-+-+-+-+-+-+-+-+
|                        occupancy_status                        |
+-+-+-+-+-+-+-+-+-+-+-+-+-+-+-+-+-+-+-+-+-+-+-+-+-+-+-+-+-+-+-+-+
|                              ...                               |
+-+-+-+-+-+-+-+-+-+-+-+-+-+-+-+-+-+-+-+-+-+-+-+-+-+-+-+-+-+-+-+-+
|                        occupancy_status                        |
+-+-+-+-+-+-+-+-+-+-+-+-+-+-+-+-+-+-+-+-+-+-+-+-+-+-+-+-+-+-+-+-+
```

In another embodiment, as shown in Table 7, "W" indicates how many bits are employed to indicate the occupancy_status information in the "occupancy status", for instance, 0 indicates 1 bit, 1 indicates 2 bit, and the rest may be deduced by analogy. The others fields in Table 7 are similar to those fields in Table 6, so they are not repeatedly described here.

TABLE 8

Format of the sub_TLV representing potential wavelength connectivity

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|D| B |C|  Compression    |            Reserved                 |
         algorithm
+-+-+-+-+-+-+-+-+-+-+-+-+-+-+-+-+-+-+-+-+-+-+-+-+-+-+-+-+-+-+-+-+
|              row              |            column             |
+-+-+-+-+-+-+-+-+-+-+-+-+-+-+-+-+-+-+-+-+-+-+-+-+-+-+-+-+-+-+-+-+
|                           reach_link                          |
+-+-+-+-+-+-+-+-+-+-+-+-+-+-+-+-+-+-+-+-+-+-+-+-+-+-+-+-+-+-+-+-+
|                           bitmap list                         |
+-+-+-+-+-+-+-+-+-+-+-+-+-+-+-+-+-+-+-+-+-+-+-+-+-+-+-+-+-+-+-+-+
|                              ......                           |
+-+-+-+-+-+-+-+-+-+-+-+-+-+-+-+-+-+-+-+-+-+-+-+-+-+-+-+-+-+-+-+-+
|                              ......                           |
+-+-+-+-+-+-+-+-+-+-+-+-+-+-+-+-+-+-+-+-+-+-+-+-+-+-+-+-+-+-+-+-+
|                              ......                           |
+-+-+-+-+-+-+-+-+-+-+-+-+-+-+-+-+-+-+-+-+-+-+-+-+-+-+-+-+-+-+-+-+
|                              ......                           |
+-+-+-+-+-+-+-+-+-+-+-+-+-+-+-+-+-+-+-+-+-+-+-+-+-+-+-+-+-+-+-+-+
|                              ......                           |
+-+-+-+-+-+-+-+-+-+-+-+-+-+-+-+-+-+-+-+-+-+-+-+-+-+-+-+-+-+-+-+-+
|                              ......                           |
+-+-+-+-+-+-+-+-+-+-+-+-+-+-+-+-+-+-+-+-+-+-+-+-+-+-+-+-+-+-+-+-+
|                              ......                           |
+-+-+-+-+-+-+-+-+-+-+-+-+-+-+-+-+-+-+-+-+-+-+-+-+-+-+-+-+-+-+-+-+
```

An embodiment as shown in Table 8, besides potential wavelength connectivity information bit stream, may also include overhead information added for simplifying or analyzing the bit stream, examples are explained as follows. "D" indicates the direction, that is, whether the wavelength connectivity of the TE links carried in the sub_TLV is unidirectional or bidirectional. For instance, if "D" indicates that the direction is bidirectional, Table 8 also indicates the wavelength connectivity in the direction from the link TE4 to the link TE1. "B" indicates whether the cross-connect of the wavelengths is blocked. For instance, 00 indicates the cross-connect is blocked. The blocking state of the wavelengths is described in the subsequent bitmap list. 01 indicates that each wavelength of the two TE links can be cross-connected to a same wavelength in a non-blocking way. 10 indicates Reserved. 11 indicates non-blocking, that is, any wavelength of the TE link can reach any wavelength of the other specified TE link. In the case of non-blocking, the value of "row" and "column" can be omitted and "bitmap list" is 1 for all, therefore the "bitmap list" may be omitted. "C" is a data compression indication. For instance, 0 indicates the subsequent potential wavelength connectivity information bit stream is not compressed. 1 indicates that the subsequent potential wavelength connectivity information bit stream is compressed. "Compression algorithm" indicates the used compression algorithm. For instance, when "C" is set to 1, "Compression algorithm" indicates the used compression algorithm. "Reserved" indicates that these bits are reserved. In another embodiment, there may exist "W" before the field "Reserved", "W" indicates how many bits are employed to indicate the connectivity information in the "bitmap list", for instance, 0 indicates 1 bit, 1 indicates 2 bit, the rest may be deduced by analogy. "row" and "column" indicate the number of rows and the number of columns in the matrix "bitmap list", in other embodiments, there may not exist "row" and "column". "reach_link" indicates the potential wavelength connectivity of which TE link the sub-TLV represents. Because the source TE link is already indicated in the upper-layer TLV, the sub-TLV may only indicate the destination TE link. "bitmap list" indicates whether the wavelengths are reachable, that is, the potential wavelength connectivity information bit stream. In other embodiments, there may exist several "reach_link" and "bitmap list" like those in Table 5, so they are not repeated here.

The following example is given to explain this case, a wavelength sequence is distributed separately, and not distributed again during the distribution a information bit stream of which corresponding wavelength sequence is consistent with the distributed wavelength sequence. Wavelength sequence represents all the wavelengths that a TE link can support. Once a hardware device is determined, the wavelengths supported by a TE link on the device are also determined. The wavelength sequence may be distributed at the system initialization and does not need to be distributed in real time if the wavelength sequence does not change. During the distribution of a potential wavelength connectivity information bit stream or a wavelength occupancy status information bit stream of which corresponding wavelength sequence is consistent with the distributed wavelength sequence, the corresponding wavelength sequence may not be distributed again. A recipient may analyze the potential wavelength connectivity information bit stream or a wavelength occupancy status information bit stream based on the wavelength sequence distributed previously. For instance, a wavelength sequence may be distributed in the form shown in Table 9 and Table 10, and the wavelength occupancy status information bit stream may be distributed in the form shown in Table 11. The occupancy_status bit sequence shown in Table 11 is consistent with the wavelength sequence shown in Table 9 or Table 10. Likewise, the potential wavelength connectivity information may be generated into a bit stream based on the wavelength sequence shown in Table 9 or Table 10 and then the bit stream may be analyzed based on the wavelength sequence also.

TABLE 9

Wavelength sequence of the link TE1

| Wavelength No. | λ1 | λ2 | λ3 | λ4 | λ5 | λ6 | λ7 | λ8 | ... | λ35 | λ36 | λ37 | λ38 | λ39 | λ40 |
|---|---|---|---|---|---|---|---|---|---|---|---|---|---|---|---|

TABLE 10

Wavelength sequence of the link TE4

| Wavelength No. | λ1 | λ2 | λ3 | λ4 | λ5 | λ6 | λ7 | λ8 | ... | λ35 | λ36 | λ37 | λ38 | λ39 | λ40 |
|---|---|---|---|---|---|---|---|---|---|---|---|---|---|---|---|

TABLE 11

Wavelength occupancy status

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Reserved            |          lambda_num           |
+-+-+-+-+-+-+-+-+-+-+-+-+-+-+-+-+-+-+-+-+-+-+-+-+-+-+-+-+-+-+-+-+
|                        occupancy_status                       |
+-+-+-+-+-+-+-+-+-+-+-+-+-+-+-+-+-+-+-+-+-+-+-+-+-+-+-+-+-+-+-+-+
|                             ......                            |
+-+-+-+-+-+-+-+-+-+-+-+-+-+-+-+-+-+-+-+-+-+-+-+-+-+-+-+-+-+-+-+-+
```

In another embodiment, there may exist "W", for instance, before the field "Reserved", "W" indicates how many bits are employed to indicate the occupancy_status information in the "occupancy_status", for instance, 0 indicates 1 bit, 1 indicates 2 bit, the rest may be deduced by analogy.

An embodiment further provides a method for distributing information: A potential wavelength connectivity information bit stream is generated from potential wavelength connectivity information and then distributed, and wavelength occupancy status information is directly distributed. In the embodiment of the present disclosure, the potential wavelength connectivity information is distributed in the format shown in Table 8 and wavelength occupancy status information is distributed in a sub-TLV format shown in Table 12.

TABLE 12

Format of the sub TLV representing wavelength availability

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Reserved            |          lambda_num           |
+-+-+-+-+-+-+-+-+-+-+-+-+-+-+-+-+-+-+-+-+-+-+-+-+-+-+-+-+-+-+-+-+
|                         lambda1_value                         |
+-+-+-+-+-+-+-+-+-+-+-+-+-+-+-+-+-+-+-+-+-+-+-+-+-+-+-+-+-+-+-+-+
|                        occupancy_status                       |
+-+-+-+-+-+-+-+-+-+-+-+-+-+-+-+-+-+-+-+-+-+-+-+-+-+-+-+-+-+-+-+-+
|                         lambda2_value                         |
+-+-+-+-+-+-+-+-+-+-+-+-+-+-+-+-+-+-+-+-+-+-+-+-+-+-+-+-+-+-+-+-+
|                        occupancy_status                       |
+-+-+-+-+-+-+-+-+-+-+-+-+-+-+-+-+-+-+-+-+-+-+-+-+-+-+-+-+-+-+-+-+
|                             ......                            |
+-+-+-+-+-+-+-+-+-+-+-+-+-+-+-+-+-+-+-+-+-+-+-+-+-+-+-+-+-+-+-+-+
|                             ......                            |
+-+-+-+-+-+-+-+-+-+-+-+-+-+-+-+-+-+-+-+-+-+-+-+-+-+-+-+-+-+-+-+-+
|                         lambdan_value                         |
+-+-+-+-+-+-+-+-+-+-+-+-+-+-+-+-+-+-+-+-+-+-+-+-+-+-+-+-+-+-+-+-+
|                        occupancy_status                       |
+-+-+-+-+-+-+-+-+-+-+-+-+-+-+-+-+-+-+-+-+-+-+-+-+-+-+-+-+-+-+-+-+
```

In Table 12, "Reserved" indicates the bits are reserved; "lambda_num" indicates the number of wavelengths borne on the TE link; "lambda1_value" indicates the number of the first wavelength borne on the TE link; "lambdan_value" indicates the number of the nth wavelength borne on the TE link; "occupancy_status" indicates whether the wavelength is occupied.

S405: The node information of the optical node is obtained from the received bit stream and the wavelength sequence.

Taking this case as an example, the wavelength sequence corresponding to the potential wavelength connectivity information bit stream distributed by the optical node is consistent with the wavelength sequence corresponding to the wavelength occupancy status information bit stream distributed by the optical node, and the corresponding wavelength sequence is distributed during the distribution of the wavelength occupancy status information bit stream. After receiving a packet that carries the wavelength occupancy status information bit stream, the other optical nodes in the WDM network or a centralized path computation unit such as a path computation element (PCE) may analyze the received potential wavelength connectivity information bit stream and wavelength occupancy status information bit stream according to the wavelength sequence (such as the lambda_value in the wavelength availability sub-TLV shown in Table 6) carried in the packet so as to obtain the node information of the optical node, and may then assign wavelengths and routes in the WDM network according to the analyzed node information.

In another embodiment, the information bit stream generated at S403 may be compressed before the distribution of the information bit stream and the wavelength sequence corresponding to the node information, so as to maximally reduce the data volume. For instance, the bitmap list information is coded by using a coding method such as a Run-Length Coding (RLC), so as to maximally reduce the data volume. Furthermore, the coding method may be expressed by some bits of a sub_TLV. Upon receipt of these data, the other nodes decode the data using the same coding method according to the indication bit of the coding method and then analyze the potential wavelength connectivity information using the above-mentioned method. Likewise, upon receipt of the packet, the other nodes or the centralized path computation unit in the WDM network may also decompress the packet before analyzing the bit stream.

An embodiment also provides an RLC compression mode. When an optical node has only partial wavelength conversation capability, especially when the potential wavelength connectivity information contains only a few 1s and the number of 0s is far greater than the number of 1s in the potential wavelength connectivity information bit steam, using compression algorithm will better show its advantages. It is assumed that the potential wavelength connectivity information between two TE links on a node is expressed as the bit stream with 10 rows and 9 columns as shown in Table 13 and the RLC mode is used to compress the data of the bit stream.

TABLE 13

```
0 0 0 0 0 0 0 0 0
0 0 0 0 0 1 0 0 0
0 0 0 0 0 0 1 1 0
0 0 0 0 0 0 0 0 0
0 0 0 0 0 0 0 0 0
0 1 0 0 0 0 0 0 0
0 0 0 0 0 0 0 0 0
0 0 0 0 0 0 0 0 0
0 0 0 0 0 1 1 0 0
0 0 0 0 0 0 0 0 0
```

TABLE 14

0→0→0→0→0→0→0→0→0→
→0→0→0→0→0→0→1→0→0→0→
→0→0→0→0→0→0→1→1→0→
→0→0→0→0→0→0→0→0→0→
→0→0→0→0→0→0→0→0→0→
→0→1→0→0→0→0→0→0→0→
→0→0→0→0→0→0→0→0→0→
→0→0→0→0→0→0→0→0→0→
→0→0→0→0→0→1→1→0→0→
→0→0→0→0→0→0→0→0→0

TABLE 15

Uncompressed bit stream

0...010...0110...010...0110...0  A stream of 90 bits
14 0s    9 0s     20 0s   30 0s   11 0s The bit stream may be organized by rows and columns by the way shown in Table 14 into the form shown in Table 15, that is, 001000000000110000000000000000000000100000000000000000000000000001100000000000.

After the RLC coding, the stream of 90 bits can be compressed into a stream of 40 bits shown in Table 16, that is, 1110100100001111010111111111000000001011. The above-mentioned coding mode is only a mode in an embodiment. In practical application, other coding modes may be employed to compress and decompress data.

TABLE 16

| | | | The stream after RLC | | | | | | |
|---|---|---|---|---|---|---|---|---|---|
| Run length (binary) | 1110 | 1001 | 0000 | 1111 | 0101 | 1111 | 1111 | 0000 | 0000 | 1011 |
| Run length (decimal) | 14 | 9 | 0 | 15 | 5 | 15 | 15 | 0 | 0 | 11 |

In the method for distributing node information according to various embodiments, an information bit steam is generated from the node information and the volume of data in the node information that an optical node distributes is effectively reduced. Furthermore, node information is divided by features into static information and dynamic information. An optical node may distribute the dynamic information in real time. Therefore, the volume of data distributed by each optical node is further reduced.

Figure 5:
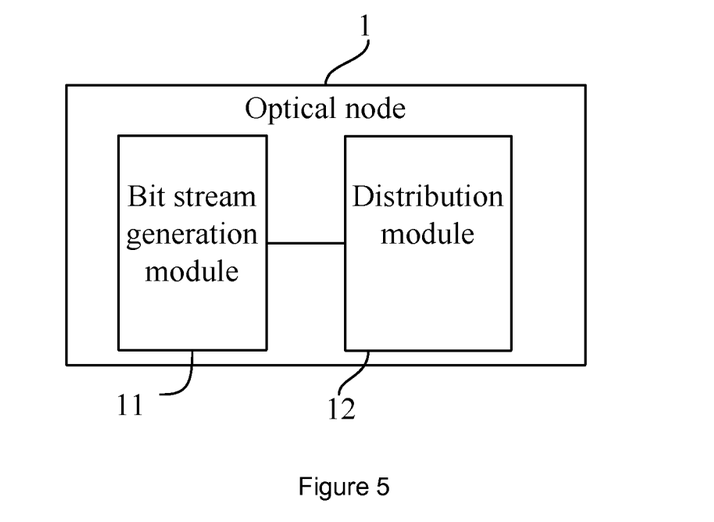
FIG. 5 shows the simplified structure of an optical node according to an embodiment.
Figure 6:
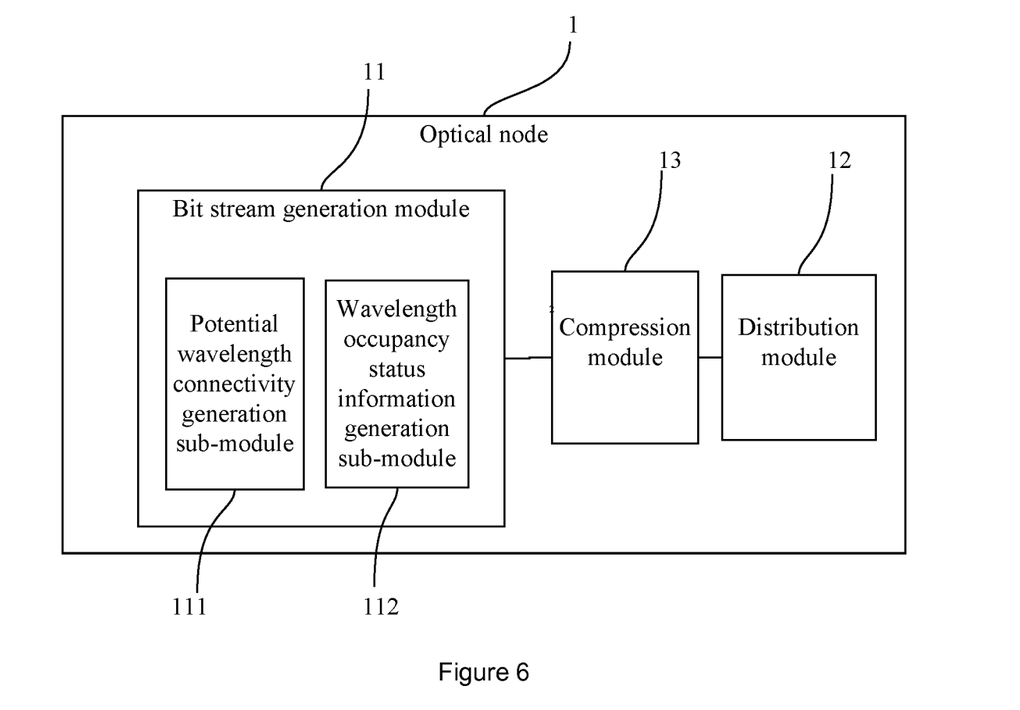
FIG. 6 shows the simplified structure of an optical node according to an embodiment.

An embodiment provides an optical node. As shown in FIG. 5, an optical node 1 includes a bit stream generation module 11 and a distribution module 12. The bit stream generation module 11 generates an information bit stream based on node information of its own. The distribution module 12 distributes the generated information bit stream and a wavelength sequence corresponding to the node information, for instance, it floods the generated information bit stream and the wavelength sequence corresponding to the node information via an extended IGP protocol to other optical nodes. This optical node transforms the node information into a bit stream, so that the data volume distributed by the optical node is maximally reduced.

In another embodiment, as shown in FIG. 5, the bit stream generation module 11 may include a potential wavelength connectivity information generation sub-module 111 and/or a wavelength occupancy status information generation sub-module 112. The potential wavelength connectivity information generation sub-module 111 is configured to generate a potential wavelength connectivity information bit stream based on the potential wavelength connectivity information between two TE links on the optical node, for instance, generate a potential wavelength connectivity information bit stream as shown in Table 4 according to a potential wavelength connectivity information as shown in Table 3. The wavelength occupancy status information generation sub-module 112 is configured to generate a wavelength occupancy status information bit stream based on a wavelength occupancy status information of the TE links on the optical node, for instance, generate a wavelength occupancy status information bit stream as shown in Table 6 or Table 10.

In another embodiment, the optical node 1 may further include a compression module 13 which is configured to compresses the information bit stream that the bit stream generation module 11 generates, so as to further reduce the data volume distributed.

The operation modes of each module in the optical node has already described in various embodiments, so they are not repeated here.

An embodiment further provides a system for distributing node information. The system includes a first optical node, a second optical node or a centralized path computation unit. The number of the optical node or the centralized path computation unit in the system may be more than one. The first optical node is configured to generate an information bit stream based on its own node information, and distribute the generated information bit stream and a wavelength sequence corresponding to the node information. The second optical node or a centralized path computation unit is configured to obtain the node information of the first node based on the received bit stream and wavelength sequence.

Figure 7:
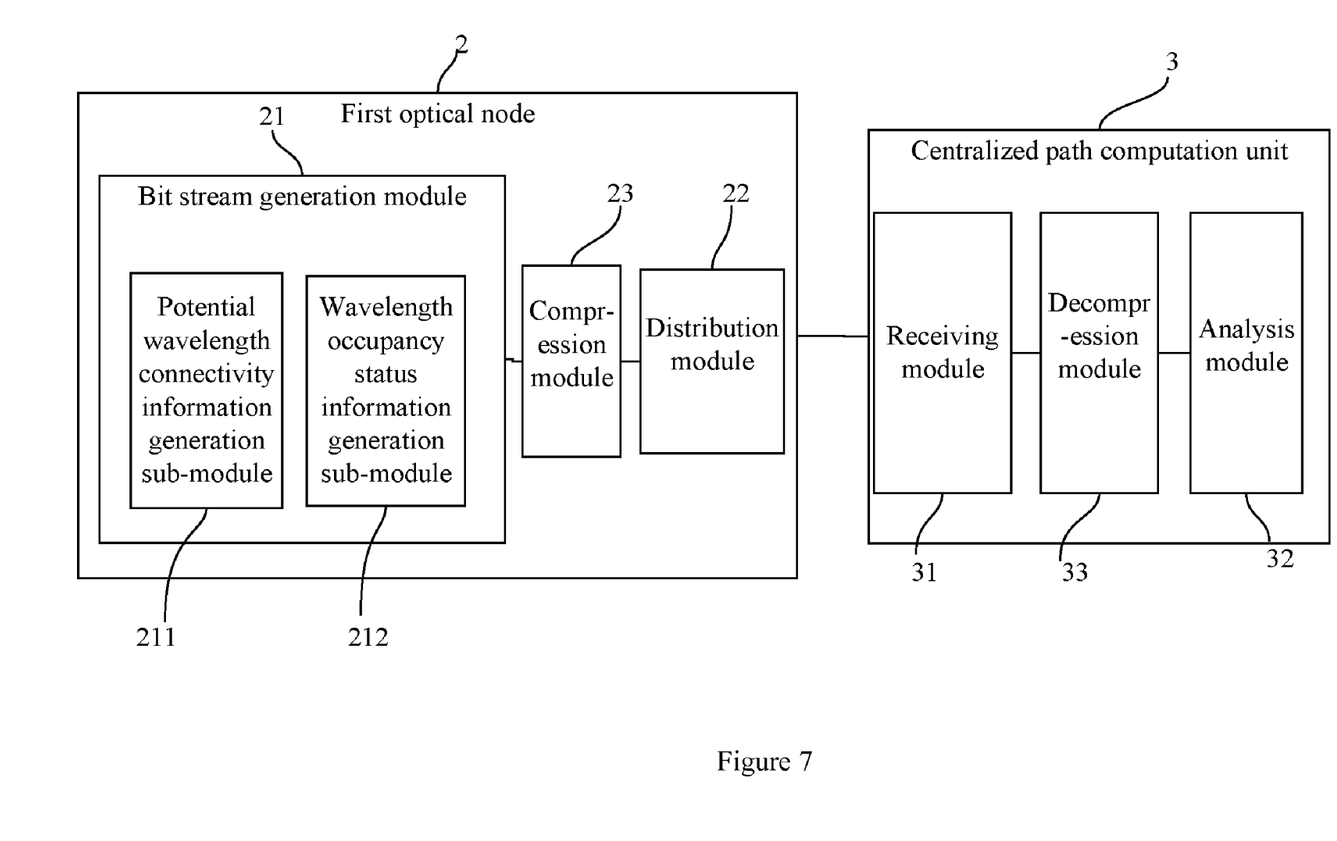
FIG. 7 shows the simplified structure of a system for distributing optical node information according to an embodiment.

An example is shown in FIG. 7. A first optical node 2 includes a bit stream generation module 21 and a distribution module 22. For instance, the bit stream generation module 21 may include a potential wavelength connectivity information generation sub-module 211 and/or a wavelength occupancy status information generation sub-module 212. For instance, the first optical node 2 also includes a compression module 23 which is configured to compresses the information bit stream that the bit stream generation module 21 generates, so as to further reduce the data volume distributed. The structure of the first optical node 2 may be the same as the embodiments of the optical node, so they are not repeated here.

The first optical node may connect to one or more optical nodes and/or centralized path computation units, For instance, in FIG. 7, the first optical node 2 connects to a centralized path computation unit 3. The centralized path computation unit 3 may include a receiving module 31 and an analysis module 32. The receiving module 31 receives the bit stream and wavelength sequence from the first optical node 2. The analysis module 32 analyzes the bit stream and wavelength sequence that the receiving module 31 receives, so as to obtain the node information of the first optical node 2, such as obtaining a potential wavelength connectivity information or wavelength occupancy status information of the first optical node 2. If the received bit stream distributed by the first optical node 2 has been compressed, the centralized path computation unit 3 may further include a decompression module 33 which is configured to decompress the received bit stream and transmit the decompressed bit stream to the analysis module 32.

In other embodiments, if the first optical node connects to other optical node, the structure of the other optical node for receiving, analyzing or decompressing the node information may be the same as the corresponding structure of the embodiments of the centralized path computation unit, so they are not repeated here. In this way, the optical node or centralized path computation unit may obtain the information distributed by each node in a WDM optical network, so that the assignment of wavelength and route may become more accurate and faster according to the node information distributed by each node.

Figure 8:
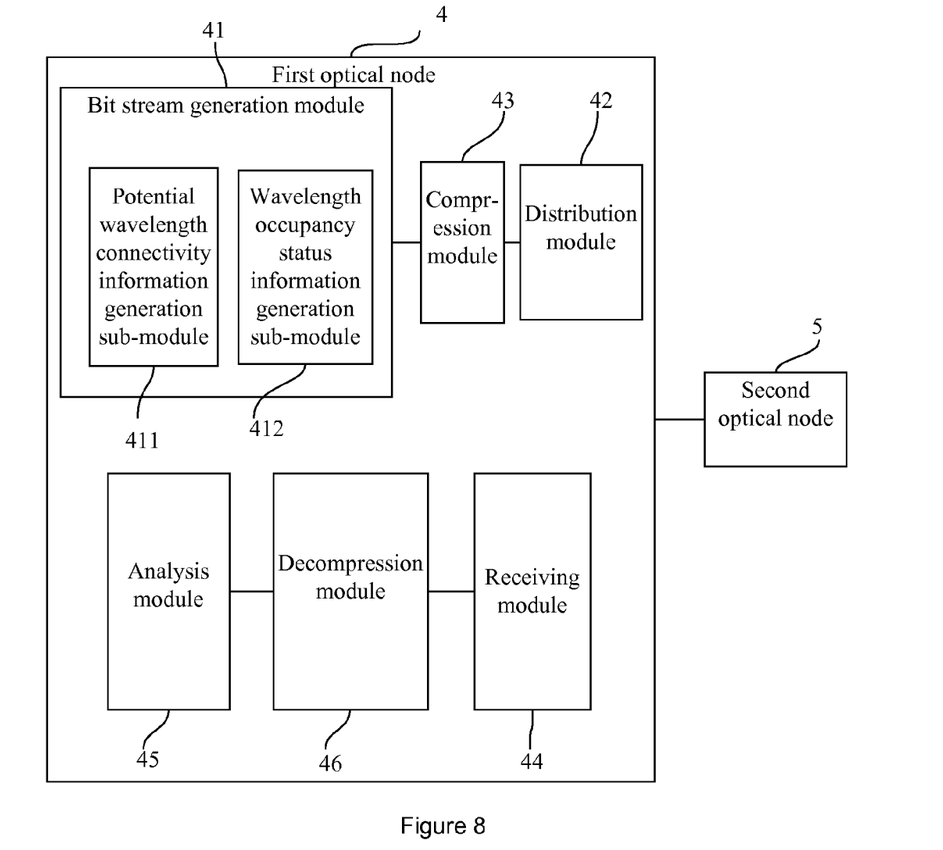
FIG. 8 shows the simplified structure of a system for distributing optical node information according to an embodiment.

In another embodiment, the system includes several optical nodes provided with same structure of distributing and receiving the node information. An example is shown in FIG. 8, the system includes a first optical node 4 and a second optical node 5. The first optical node 4 and the second optical node 5 have the same structure of distributing and receiving the node information. The optical node 4 includes a bit stream generation module 41 and a distribution module 42. The bit stream generation module 41 includes a potential wavelength connectivity information generation sub-module 411 and/or a wavelength occupancy status information generation sub-module 412. For instance, the first optical node 4 may also include a compression module 43. The above-mentioned modules of the first optical node 4 are similar with those of the optical node 2. The first optical node 4 may also include a receiving module 44 and an analysis module 45. The receiving module 44 receives a bit stream and a wavelength sequence distributed by the second optical node 5. An analysis module 45 analyzes the received bit stream and wavelength sequence to obtain the node information of the second optical node 5. If the received bit stream distributed by the second optical node 5 has been compressed, the first optical node 4 may further include a decompression module 46 which decompresses the received bit stream and transmits the decompressed bit stream to the analysis module 45. In this way, each optical node in the system may distribute and analyze the information of other nodes, so that each optical node may assign the wavelength and route more accurate and faster in the WDM optical network based on the node information (such as potential wavelength connectivity information) distributed by each node.

The operation modes of each module in the system have already been described in the previous embodiments, so they are not repeated here.

Through the above descriptions of various embodiments, those skilled in the art can clearly understand that the embodiments can be implemented by software plus a universal hardware platform or by hardware only. Based on such an understanding, the embodiments may be embodied by computer software stored in a storage media which includes code for performing the methods according to the embodiments of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for distributing node information, comprising the following steps:
generating, by an optical node, an information bit stream based on its own node information, wherein the node information comprises potential wavelength connectivity information and wavelength occupancy status information, wherein potential wavelength connectivity capability of each pair of wavelengths is represented by at least one bit, bits representing potential wavelength connectivity capability between all the wavelengths of two traffic engineering (TE) links on the optical node constitute potential wavelength connectivity information bit stream of the optical node, occupancy status of a wavelength is represented by at least one bit, bits representing occupancy status of all wavelengths of a TE link on the optical node constitute wavelength occupancy status information bit stream of the optical node; and
distributing, by the optical node, the generated information bit stream and a wavelength sequence corresponding to the node information, wherein the generated information bit stream comprises the potential wavelength connectivity information bit stream and the wavelength occupancy status information bit stream.

2. The method for distributing node information of claim 1, wherein the distributing the generated information bit stream and the wavelength sequence corresponding to the node information by the optical node comprises: distributing the generated information bit stream and the wavelength sequence corresponding to the node information together or separately.

3. The method for distributing node information of claim 1, further comprising: if the wavelength sequence corresponding to the node information has been distributed, during the distribution of the generated information bit stream, the wavelength sequence is not distributed again.

4. The method for distributing node information of claim 1, wherein the generating and the distributing the potential wavelength connectivity information bit stream are performed when a device of the optical node is initialized or changed, or the capability of a device of the optical node is changed.

5. The method for distributing node information of claim 1, wherein the generating and the distributing the wavelength occupancy status information bit stream are performed by the optical node periodically and/or in real time.

6. The method for distributing node information of claim 1, wherein the distributing the generated information bit stream comprises: flooding the generated information bit stream by the optical node via an extended Interior Gateway Protocol, IGP, to other optical nodes or centralized path computation units.

7. The method for distributing node information of claim 1, wherein before distributing the generated information bit stream by the optical node comprises: compressing the generated information bit stream by the optical node.

8. An optical node, comprising a bit stream generation module and a distribution module, wherein
the bit stream generation module is configured to generate an information bit stream based on the node information of the optical node itself, wherein the node information comprises potential wavelength connectivity information and wavelength occupancy status information, wherein potential wavelength connectivity capability of each pair of wavelengths is represented by at least one bit, bits representing potential wavelength connectivity capability between all the wavelengths of two traffic engineering (TE) links on the optical node constitute potential wavelength connectivity information bit stream of the optical node, occupancy status of a wavelength is represented by at least one bit, bits representing occupancy status of all wavelengths of a TE link on the optical node constitute wavelength occupancy status information bit stream of the optical node; and the distribution module is configured to distribute the generated information bit stream and a wavelength sequence corresponding to the node information, wherein the generated information bit stream comprises the potential wavelength connectivity information bit stream and the wavelength occupancy status information bit stream.

9. The optical node of claim 8, further comprising: a compression module, configured to compress the information bit stream generated by the bit stream generation module.

10. A system for distributing node information, comprising:
   a first optical node, configured to generate an information bit stream based on its own node information, wherein the node information comprises potential wavelength connectivity information and wavelength occupancy status information, wherein potential wavelength connectivity capability of each pair of wavelengths is represented by at least one bit, bits representing potential wavelength connectivity capability between all the wavelengths of two traffic engineering (TE) links on the optical node constitute potential wavelength connectivity information bit stream of the optical node, occupancy status of a wavelength is represented by at least one bit, bits representing occupancy status of all wavelengths of a TE link on the optical node constitute wavelength occupancy status information bit stream of the optical node, and distribute the generated information bit stream and a wavelength sequence corresponding to the node information, wherein the generated information bit stream comprises the potential wavelength connectivity information bit stream and the wavelength occupancy status information bit stream; and
   a second optical node or a centralized path computation unit, configured to obtain the node information of the first node based on the received bit stream and wavelength sequence.

11. The system for distributing node information of claim 10, wherein the first optical node comprises a bit stream generation module and a distribution module, wherein
   the bit stream generation module is configured to generate the information bit stream based on the node information of the optical node itself; and
   the distribution module is configured to distribute the generated information bit stream and the wavelength sequence corresponding to the node information.

12. The system for distributing node information of claim 11, further comprising a compression module, configured to compress the information bit stream generated by the bit stream generation module.

13. The system for distributing node information of claim 10, wherein the second optical node or the centralized path computation unit comprises a receiving module and a analysis module, wherein
   the receiving module is configured to receive the bit stream and the wavelength sequence distributed by the first optical node; and
   the analysis module is configured to analyze the bit stream and the wavelength sequence received by the receiving module and obtain the node information of the first optical node;
   if the received bit stream distributed by the first optical node has been compressed, the second optical node or the centralized path computation unit further comprises a decompression module, configured to decompress the received bit stream and transmit the decompressed bit stream to the analysis module.

14. The method for distributing node information of claim 1, wherein before distributing the generated information bit stream by the optical node comprises: compressing, by the optical node, the generated information bit stream by using a run-length coding mode.

15. The method for distributing node information of claim 1, wherein the potential wavelength connectivity information describe the connectivity from all wavelengths of a source TE link to all wavelengths of a destination TE link.

16. The method for distributing node information of claim 15, wherein the potential wavelength connectivity information bit stream of the optical node comprises B field, reach_link field, row field, column field and a matrix; wherein the B field indicates whether the cross-connect of the wavelengths is blocked, the reach_link field indicates the destination TE link involved in the potential wavelength connectivity information, and the row and column field indicate the number of rows and the number of columns in the matrix represented all wavelengths of the source TE link to all wavelengths of the destination TE link.

17. The method for distributing node information of claim 16, wherein the B field including at least one of indicates: blocking, each wavelength of two TE links can be cross-connected to a same wavelength, and non-blocking.

18. The method for distributing node information of claim 1, wherein the optical node has a first TE link and a second TE link, the first TE link bears N different wavelengths, the second TE link bears M different wavelengths, M and N each are a integer greater than one;
   wherein the generated information bit stream has N blocks of M consecutive bits, each block indicates the potential wavelength connectivity capability of a respective given one of the N wavelengths borne on the first TE link with respect to the M wavelengths borne on the second TE link, each bit of the M consecutive bits in the each block indicates whether the given one wavelength borne on the first TE link can be switched to a respective one of the M wavelengths borne on the second TE link by cross-connecting;
   wherein the generated information bit stream further has another block of M consecutive bits that indicate occupancy status of the M wavelengths borne on the second TE link, each bit of the M consecutive bits in the another block indicates whether a respective one of the M wavelengths borne on the second TE link is occupied or not.

* * * * *